United States Patent [19]

Bloks et al.

[11] Patent Number: 4,813,334
[45] Date of Patent: Mar. 21, 1989

[54] ARMOUR PLATE

[75] Inventors: Hubertus M. H. A. Bloks, Elim; Jan Bellinga, Hoogeveen, both of Netherlands

[73] Assignee: Fokker Special Products b.v., Netherlands

[21] Appl. No.: 65,332

[22] Filed: Jun. 22, 1987

[30] Foreign Application Priority Data

Jun. 24, 1986 [NL] Netherlands ............... 8601650

[51] Int. Cl.⁴ ............................................. F41H 5/04
[52] U.S. Cl. ................................... 89/36.02; 109/82; 428/911
[58] Field of Search .................. 428/911; 109/80, 82, 109/83, 84; 89/36.01–36.11

[56] References Cited

U.S. PATENT DOCUMENTS

| | | | |
|---|---|---|---|
| 2,279,110 | 4/1942 | Collins | 89/36.02 |
| 3,444,033 | 5/1969 | King | 428/911 |
| 3,516,898 | 6/1970 | Cook | 428/911 |
| 3,616,115 | 10/1971 | Klimmek | 89/36.02 |
| 3,702,593 | 11/1972 | Fine | 89/36.02 |
| 3,867,239 | 2/1975 | Alesi et al. | 428/911 |
| 3,962,976 | 6/1976 | Kelsey | 89/36.02 |
| 4,131,053 | 12/1978 | Ferguson | 89/36.02 |
| 4,489,663 | 12/1984 | Poag et al. | 109/82 |
| 4,529,640 | 7/1985 | Brown | 89/36.02 |
| 4,664,967 | 5/1987 | Tasdemiroglu | 428/911 |

FOREIGN PATENT DOCUMENTS

| | | |
|---|---|---|
| 1578336 | 3/1972 | Fed. Rep. of Germany . |
| 3508848 | 9/1986 | Fed. Rep. of Germany ..... 89/36.02 |
| 1566448 | 3/1969 | France . |
| 2140701 | 1/1973 | France . |
| 1142689 | 2/1969 | United Kingdom . |

Primary Examiner—David H. Brown
Attorney, Agent, or Firm—Handal & Morofsky

[57] ABSTRACT

Armour plate with multi-layer structure, comprising on the front side a first layer of ceramic material made up of abutting tiles, on the rear side a second layer of fibre-reinforced plastic laminate, and between these layers a third layer consisting of several mutually bonded metal plates. The first layer is fixedly connected to the respective outer plate of the third layer by means of a strong adhesive bonded joint. The metal plates of the third layer as well as the second layer are joined together either by means of an adhesive bonded joint the strength of which is sufficient to hold the structure together when the armour plate is unstressed, but under stress when a missile hits the armour plate, will easily come loose at the point of impact, or by other means. The bond between the metal plates of the third layer as well as between the second and third layer extends either over the whole surface or only part thereof for instance only at the edges of the armour plate.

8 Claims, 2 Drawing Sheets

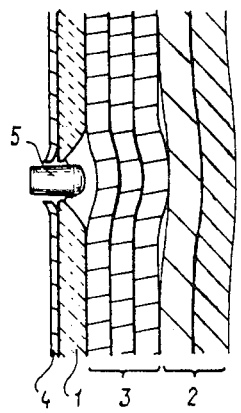
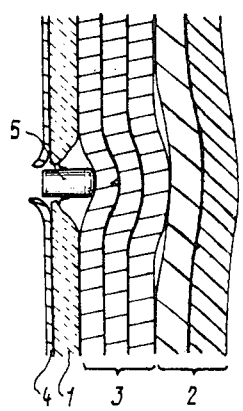
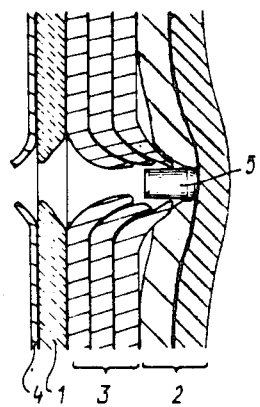
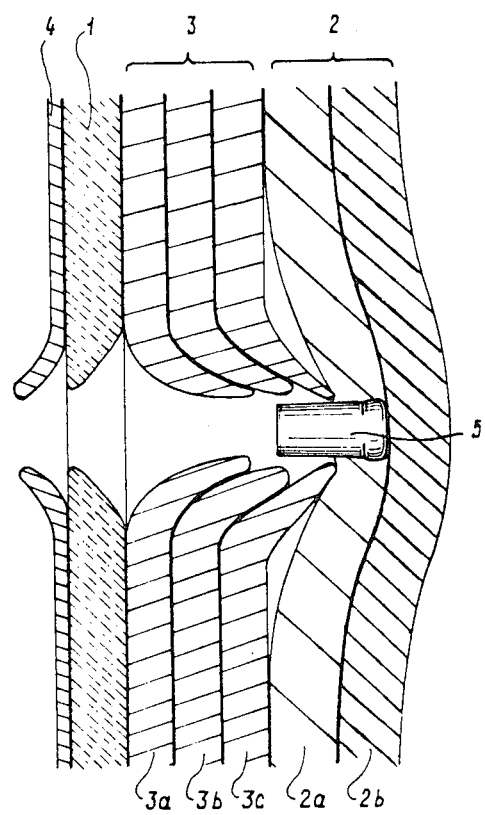

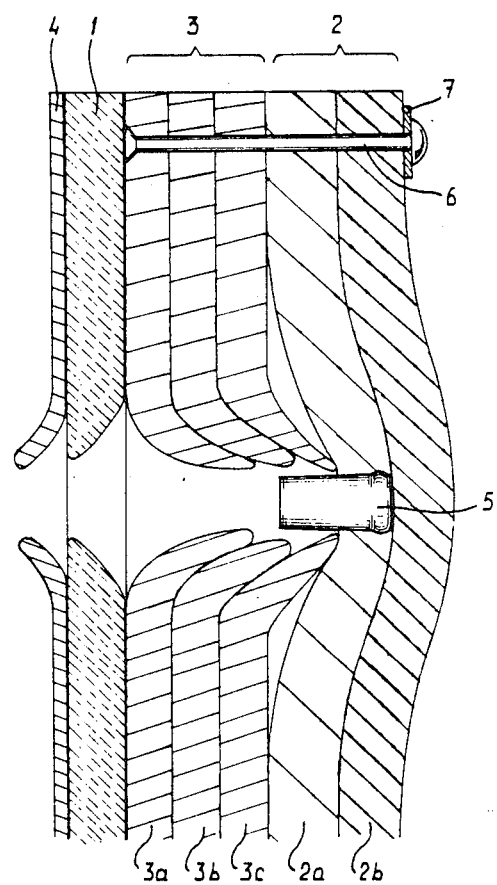

ARMOUR PLATE

The invention relates to an armour plate with multilayer structure, comprising on the front side a first layer of ceramic material made up of tiles abutting each other, and on the rear side a second layer of plastic laminate reinforced with fibres.

An armour plate is fixed to an object or forms an integral part of an object and serves to prevent damage to said object following the impact of ballistic missiles or fragments thereof. Missiles or fragments can be in various forms and can vary in speed, mass and impact direction. The type of material of the missile also has an influence on the damage which can be caused on impact. When designing an armour plate it is therefore important to determine beforehand against what type of missiles protection is sought. For example, one can base the design on protection against the effect of a grenade exploding some distance away from the armour plate, or protection against sharp steel bullets. Resistance to these missiles generally means that the armour plate must have a layer of ceramic material on the front side, the side hit by the missiles. The book "Ballistic Materials and Penetration Mechanics", 1980, by R. C. Laible gives a good outline of the developments in armour plate and the possibilities offered by modern construction materials.

An example of armour-plating with ceramic tiles which are fixed with a layer of adhesive on a fibre-reinforced plastic laminate is described in U.S. Pat. No. 3,683,828. Ceramic materials are hard, brittle and rigid and are stronger under compressive strain than under tensile strain. The best known types are aluminium oxide, silicon carbide and borium carbide. The first-mentioned type is the cheapest, while the last-mentioned is the hardest. When a missile hits the tile, the hard, bend-resistant tile blunts the front side of the missile through plastic deformation, and the tip may or may not be broken off. If the tile splinters locally in the process, the missile will, if it has sufficient remaining kinetic energy, penetrate into the laminate lying behind. The more the tile has flattened the front side of the projectile, the less chance there is of the construction lying behind being penetrated. If the construction behind consists of a laminate of resin and a number of fabric layers, then the kinetic energy of the missile will have to be absorbed by this laminate, which means that resin fracture and detachment between the resin and the fibres will occur.

A disadvantage of constructions in which the ceramic tiles are glued to a fibre-reinforced laminate is that the brittle tile has little support from the relatively limp supporting material and thus breaks more easily than when it has a rigid support. In U.S. Pat. No. 3,683,828 this is remedied to some extent by fitting metal strips in the surface of the laminate, in such a way that the edges of the tiles rest on them. Another disadvantage is that, if on being hit by a missile the tile breaks under the impact, broken pieces of the tile which are carried along by the missile can damage the fibres of the laminate behind to such an extent that this produces a weakening of the laminate.

Data on ceramic materials in combination with a supporting construction consisting of a laminate of fibre-reinforced plastic can be found, for example, in the unclassified US military specification Mi1-A-46103C.

In order greatly to reduce the chance of breakage in the tiles, it is, however, preferable to fix the tiles to a relatively bend-resistant base, for example a metal plate. If the metal plate is to afford sufficient protection against penetration of a missile, then t must be selected with relatively great thickness. The use of a metal plate as the support for the ceramic tiles therefore has the disadvantage that the weight of the armour plate increases considerably, which greatly limits the use of the armour plate.

The object of the invention s then to produce an armour plate provided with a supporting construction for the ceramic tiles which both has great bending strength and is very resistant to the impact forces of a missile and any parts of the tile flung off by the said missile. In accordance with this object, the invention provides for an armour plate with multi-layer structure, comprising on the front side a first layer of ceramic material made up of abutting tiles, on the rear side a second layer with fibre-reinforced plastic laminate, and between these layers a third layer consisting of several metal plates glued to each other, while the layer of adhesive between the plates of the third layer provides sufficient adhesion to hold the structure together when the armour plate is unstressed, but when a missile hits the armour plate will easily come loose at the point of impact.

Using a pack of metal plates between the ceramic tiles and the plastic laminate means that the bending strength of the supporting construction is considerably increased, with the result that fragmenting of the tiles is counteracted. In a first embodiment the metal plates of the third layer are bonded together, either by means of a continuously applied adhesive or by means of a pattern of adhesive dots. A relatively readily detaching adhesive layer is used for fixing the metal plates between the first and second layer. In an other embodiment the plates of the third layer are connected to each other only at the edges of the third layer. If the plates are only locally connected to each other also mechanical connection means such as rivets or bolts can be used. Such a composition gives the construction better resistance to the punching out of a hole by a missile than in the case of one solid plate with the same thickness. During the impact of a missile the layer of adhesive will come loose locally, and the missile will have to pierce a number of separate layers, each supported by a layer behind, which takes considerably more energy than piercing through one solid thick plate. In order to give the same protection as a single solid plate, less metal is therefore needed, which means that the weight of the plate is reduced. Moreover, disposed behind the plate pack is the lamination for absorption of any remaining kinetic energy.

On the impact of a missile, a shock wave is produced from the point of impact in both the ceramic tile and the missile, as a result of which the pressure in the material can increase to 150–300 kilobars. The greater the difference in sound velocity in tile and missile, the greater will be the shock waves and the mass displacement caused in tile and missile. The shock waves are at least partially reflected on the rear side against the metal plates. When they reach the front side they leave the material, which means that the tile can fragment locally. The wave front which fans out in the tile means that the area on which the impact takes place on the rear side of the tile is much greater than the transverse section of the missile The strain on the construction behind is thereby distributed over a greater area than the point of impact at the front side of the tile would lead one to suppose. The reflected waves sweep over an even greater area on the front side of the tile, so that breakage can occur in the tile even at a considerable distance from the point of impact. In order to avoid this breakage, it is preferable for the first layer of ceramic material to be covered on the front side by a further fourth metal layer, which is fixed to the first layer by means of a strong adhesive bond.

If the metal plate pack of the third layer bulges under the pressure of the missile, in which case the frontal surface of the deformed area of the first plate adjoining the tile will be smaller in size than that of the last plate, then the adhesive bond between the metal and the laminate behind will come loose at the curved double surface of the bulge, which increases the area of the laminate which is involved in the absorption of the kinetic energy of the missile. So long as the bulge in the plate pack is not penetrated by the missile, the laminate is subjected to bending and elongation stress and counteracts the production of the bulge.

If the missile does penetrate the metal, the torn, curled edges of the holes could damage and weaken the fibres of the laminate. In order to prevent this, the armour plate is preferably designed in such a way according to the invention that the second layer of fibre-reinforced plastic laminate consists of two part layers, the first part layer of which is provided, on the side of the said third layer, with an anisotropic coarse-mesh fibre fabric, and the second part layer of which is provided, on the rear side, with an anisotropic fine-mesh fibre fabric. The first part layer has a buffer function and prevents damage to the second part layer which, as the last layer, must provide protection against the missile. The thickness of the first part layer, depending on the dimensions of the missiles against which the armour plate has to give protection, should preferably be selected to be so great that on penetration of a missile through the said third layer the metal parts bulging therefrom cannot penetrate—or at least not to a significant extent—into the second part layer. If the metal plate pack is penetrated, the remaining kinetic energy of the meanwhile blunted missile can now be absorbed by the undamaged rear part of the laminate.

The invention will be explained in greater detail below with reference to the attached figures.

FIGS. 1A to 1C show successive stages during the impact of a missile on the armour plate according to the invention.

FIG. 2 shows, on a larger scale, again the view of FIG. 1C for a first embodiment of the armour plate.

FIG. 3 shows a similar view as FIG. 2 for a second embodiment of the armour plate.

As can be seen in particular from FIG. 2, the armour plate according to a first embodiment of the invention is made up of a number of layers, viz:

a first layer 1 consisting of adjacent ceramic tiles;

a second layer 2 of fibre-reinforced plastic laminate, this layer being divided into two part layers, indicated by 2a and 2b;

a third layer 3 between the first layer and the second layer 2, consisting of a number of metal plates glued together; the figures show three plates 3a, 3b and 3c;

a fourth layer 4 of metal on the front side of the ceramic layer 1.

The above-described structure of the armour plate according to the invention can be achieved in practice in various ways by a wide variety of materials. The choice of material depends on the type and size of the missiles which have to be stopped, and depends on whether the armour plate is a plate which must be fixed on a vehicle or housing to be protected, or whether it forms an integral part of the supporting construction of the vehicle or the housing. Moreover, there can be a design criterion for the vehicle or housing which imposes a limit on the maximum weight per square metre of the armour plate. The costs of the armour plate per square metre are, of course, an important factor to weigh up.

A description is given below of an embodiment of a plate for a mobile housing which weighs no more than 60 kg per sq.m. and is intended against fragments of a 152 mm grenade exploding at a distance of 10 meters and 7.62 mm AP bullets with an impact velocity of at least 840 m/sec in the sense that fragments and bullet do not hit the same place on the armour plate. In other words, the armour plate is resistant to at least two representative fragments for the approx. 8,000 fragments of an exploded grenade: a part with a mass of 44 grains (2.85 gram) and an impact velocity of 900 m/sec. and a part with a mass of 207 grains (13.41 gram) and velocity of 1040 m/sec.

Samples of armour plate used in field tests to prove that the construction as described below fulfilled the criteria of resistance against bullets and exploding grenades, had a first layer of tiles made of aluminium oxide $Al_2O_3$ with a thickness of 8 mm.

The fibre-reinforced plastic laminate 2 is a composition of polyurethane resin and aramide fibres, said fibres being supplied, for example, under the brand name Twaron by Akzo, and under the brand name Kevlar by Dupont. The part 2a comprises five fabric layers consisting of fibres which are 3.36 grammes per metre, of the Twaron-57 fabric type. The fibres are evenly distributed in the fabric in a pattern in two directions at right angles to each other. The part 2b is of the same structure as 2a, but the fibre in this case is 1.86 grammes per metre in weight and is of the Twaron-46 type of fabric. The layer 2b has in it five layers of fabric. As in the laminate 2a, the main directions of two successive layers of fabric form an angle of 60 or 90 degrees of arc with each other. The laminate parts 2a and 2b are each between 5 and 6 mm thick. The polymer resin used for the laminate is Recicast 2000, made by DSM-Chemie.

The metal sandwich 3 is made up of light metal alloy Al-Zn-Mg-Cu, code 7075-T6, according to the American National Standards Institute. This metal has a specific yield strength and a tensile strength which are high for aluminium alloys. It is also a tough material with an elongation according to Mil-Hdbk-5 D (June 1, 1983), FIG. 3.7.4.1.6(P), of 12%. The sandwich consists of three plates and has a total thickness of 2 mm.

The metal front plate 4 of the armour plate is of aluminium alloy, type 5754, made by Pechiney, and is 0.5 mm thick.

The adhesive for the bonding between the front plate 4 and the tiles 1 is XB 3197/XB 3180, made by Ciba-Geigy, while the adhesive for the metal plates in the layer 3 and the connection between these plates and the fibre-reinforced laminate consists of Recicast 3000 made by DSM-Chemie.

FIGS. 1A to 1C illustrate, on the basis of the results of tests, what happens on penetration of the armour plate according to the invention by a missile 5.

In FIG. 1A the missile has pierced the fourth layer 4 and has made a hole in a ceramic tile of the layer 1, so that the top of the missile is greatly blunted. The broken parts of the ceramic tile press against the layers behind and, due to the bulge which is formed in the process, a break has already been produced in the adhesive bond between the layers 3 and 2. The adhesion between the plates in the layer 3 will then also be weakened locally.

In FIG. 1B the blunted missile is pressing against the third layer 3 and in so doing ensures that the deformation produced causes the adhesive bonds between the various metal plates to come loose. Each metal plate must be pierced individually, during which the layers behind in each case provide support over a large area.

FIG. 1C, finally, shows the situation in which the three plates of the metal sandwich 3 are pierced, and the bulge occurring has loosened the adhesive bond between the layers 3 and 2 already over a large area. Space is produced locally between the laminate and the metal sandwich. The loosening will increase further after complete penetration of the sandwich 3 by the missile 5, as a result of which the final quantity of material of the laminate 2 taking part in the absorption of the kinetic energy of the missile is greatly increased. The missile in the end remains sticking into the armour plate at the front or in the rear layer 2b of the laminate 2.

The part layer 2a of the laminate 2 may possibly be damaged by bulging part layer 2a is sufficient to protect the part layer 2b. This part layer 2b is the strongest and therefore absorbs the still remaining impact energy.

A further embodiment is illustrated in FIG. 3. In this figure the same reference numbers as in FIG. 2 are used for the same components. Also this second embodiment comprises:

a first layer 1 consisting of adjacent ceramic tiles;

a second layer 2 of fibre-reinforced plastic laminate, this layer being divided into two part layers, indicated by 2a and 2b;

a third layer 3 between the first layer and the second layer 2, consisting of a number of metal plates glued together; the figures show three plates 3a, 3b and 3c;

a fourth layer 4 of metal on the front side of the ceramic layer 1.

Different from the first embodiment, the metal plates 3a, 3b and 3c of the third layer are not bonded together by adhesive joints but are maintained into the layer configuration together with the second layer by means of a number of rivets 6, one of which is shown in FIG. 3. These rivets are positioned along the edges of the armour plate such that the plates of the third layer and the second layer are only connected to each other along the edges of the armour plate. The plate 3a of the third layer, directed to the front side of the armour plate, is fixedly connected to the layer of tiles by means of a strong adhesive bonded joint.

Instead of rivets also other mechanical connection means such as bolts and nuts, hollow rivets, etc. can be used. Preferably washers, such as illustrated with 7 in FIG. 3, or metal strips extending along the edge of the armour plate, are used to prevent damage to the outer surface of the second layer by the head of the rivet 6.

Although embodiments of the invention are described in the above, it will be clear that the invention is not limited thereto, and that, for example, the number of part layers in the layers 2 and 3 can be selected differently, while other materials can also be used.

I claim:

1. Armour plate with multi-layer structure, comprising on the front side a first layer of ceramic material made up of abutting tiles, on the rear side a second layer of fibre-reinforced plastic laminate, and between these layers a third layer consisting of several mutually bonded metal plates, whereby said first layer is fixedly connected to the respective outer plate of the third layer by means of a strong adhesive bonded joint and the adhesive bonded joint between the individual plates of the third layer and the adhesive bonded joint between the second and third layers is sufficient to hold the structure together when the armour plate is unstressed, but under stress when a missile hits the armour plate, will easily come loose at the point of impact.

2. Armour plate according to claim 1, wherein the first layer of ceramic material is covered on the front side by a fourth layer made of metal, which fourth layer is fixed on the first layer by means of a strong adhesive bonded joint.

3. Armour plate according to claim 1 wherein the adhesive used in the adhesive layers between the individual plates in the third layer and between the third layer and the first layer and second layer is Recicast 3000 (DSM-Chemie).

4. Armour plate according to claim 1, wherein the metal of the third layer is made of Al-Zn-Mg-Cu alloy, code 7075-T6 (American National Standards Institute).

5. Armour plate according to claim 2, wherein the fourth layer consists of an aluminum alloy, type 5754 (Pechiney) is fixedly connected to the first layer.

6. Armour plate according to claim 1, wherein the second layer of fibre-reinforced plastic laminate consists of two part layers, the first part layer of which is provided, on the side of the said third layer, with an anisotropic coarse-mesh fibre fabric, and the second part layer of which is provided, on the rear side, with an anisotropic fine-mesh fibre fabric.

7. Armour plate according to claim 6, wherein the thickness of the first part layer of said second layer of fibre-reinforced plastic laminate is proportional to the dimensions of the missiles against which the armour plate has to give protection, and is selected to be so great that on penetration of a missile through the said third layer the metal parts bulging out therefrom cannot penetrate to a significant extent into the second part layer.

8. Armour plate with multi-layer structure, comprising on the front side a first layer of ceramic material comprising abutting tiles, on the rear side a second layer of fibre-reinforced plastic laminate, and between these layers a third layer consisting of several metal plates, whereby said first layer, comprising abutting tiles, is fixedly-connected to the respective outer plate of the third layer by means of a strong adhesive bonded joint and the individual metal plates of said third layer as well as the second layer, comprising fiber-reinforced plastic laminate, and adjacent metal plate of the third layer are joined together only at or near the edges of the armour plate structure.

* * * * *